United States Patent [19]

Shell

[11] Patent Number: 4,535,894
[45] Date of Patent: Aug. 20, 1985

[54] SEPARATOR APPARATUS FOR PEANUTS AND OTHER SEED CROPS

[76] Inventor: Melvin E. Shell, P.O. Box 1121, Stephenville, Tex. 76401

[21] Appl. No.: 460,248

[22] Filed: Jan. 24, 1983

[51] Int. Cl.³ ............................................. B07B 1/10
[52] U.S. Cl. .................................. 209/665; 171/123; 198/698; 209/307; 209/681; 209/917
[58] Field of Search ............... 209/615, 616, 606, 626, 209/659, 665, 681, 685, 910, 917, 244, 307; 198/698, 699; 130/30 C, 30 J, 21; 171/123, 126, 135, 14, 15

[56] References Cited

U.S. PATENT DOCUMENTS

| 429,135 | 6/1890 | Kleinstiver | 130/21 |
| 1,035,437 | 8/1912 | Harrington | 130/30 C |
| 1,081,593 | 12/1913 | Eisenhart et al. | 130/30 C |
| 1,250,466 | 12/1917 | Jockisch | 130/30 C |
| 1,252,425 | 12/1917 | Rogers et al. | 130/30 C |
| 1,621,744 | 3/1927 | Lindley | 209/681 |
| 1,704,805 | 3/1929 | Morris | 130/30 C |
| 2,703,953 | 3/1955 | Altemus | 55/138 |
| 3,003,632 | 10/1961 | Grotewold | 209/665 |
| 3,241,670 | 3/1966 | Shell | 209/243 |
| 4,136,507 | 1/1979 | Hobbs | 56/126 |

FOREIGN PATENT DOCUMENTS 3115852  1/1982  Fed. Rep. of Germany ...... 209/307

Primary Examiner—David A. Scherbel
Assistant Examiner—Donald T. Hajec
Attorney, Agent, or Firm—Hubbard, Thurman, Turner & Tucker

[57] ABSTRACT

Apparatus for separating peanuts and like commodities from vines and debris entrained with the peanuts during the harvesting process includes an endless conveyor forming a screen structure made up of elongated plate-like members interconnected by spaced apart endless roller chains trained over a triangular arrangement of drive shafting and supporting sprockets. The conveyor screen members are formed by the elongated plates which include horizontally projecting spaced apart tines and vertically extending rake teeth aligned with the tines. The adjacent tines and adjacent plates form openings of predetermined size for allowing peanuts to drop through the conveyor screen into a first receiving hopper while retaining stems, vine parts and other debris on the conveyor screen to be deposited in a second receiving hopper. Two separation stages are incorporated in a single endless conveyor unit to permit primary separation of peanuts which have already been de-stemmed and secondary separation of peanuts after a de-stemming process.

18 Claims, 6 Drawing Figures

SEPARATOR APPARATUS FOR PEANUTS AND OTHER SEED CROPS

BACKGROUND OF THE INVENTION

1. Field of the Invention

The present invention pertains to a conveyor type separator apparatus for separating peanuts and similar commodities from their vines and other debris collected during the harvesting process. The separator conveyor includes separate interconnected elements having spaced apart tines which form a horizontal screen structure and generally vertically extending rake teeth for conveying the material deposited on the screen therealong.

2. Background

In the art of harvesting peanuts, similar seed crops or other like commodities it is necessary to separate the peanut itself from portions of the vine which are entrained and collected with the peanut during the harvesting process. In this regard several inventions have been developed for separating peanuts from the portions of the vine remaining entangled with or connected thereto. Generally, such an apparatus is characterized by a conveyor having a generally horizontal run which is characterized by a somewhat flexible screen structure having openings large enough to permit the peanuts or other seed members to drop through the screen but retaining articles which are longer than the peanuts but not necessarily wider or having a greater cross-sectional dimensional shape. A commercially successful apparatus of the general type described herein is disclosed in detail in my U.S. Pat. No. 3,241,670. The apparatus disclosed in the aforementioned patent includes an endless conveyor having a somewhat screen-like structure made up of a set of interconnected links which provide openings large enough to allow the peanuts to drop through the conveyor screen into a trough whereby the peanuts may be carried away to a further processing or bagging operation.

However, it has been determined that separation of peanuts or similar commodities from portions of the vine, including various lengths of sticks, stems and other debris normally collected during the harvesting process, is not complete using prior art apparatus and that the collected debris tends to be retained on the conveyor screen thereby plugging some of the openings between the members making up the screen. Moreover, it is also indicated that even though dispensing apparatus has been provided in accordance with my earlier invention for metering the flow of peanuts and entraind debris onto the conveyor, further improvements in the arrangement for evenly distributing the material to be separated is desired. Accordingly, the present invention is directed to an improved conveyor type separator apparatus and system for separating peanuts and like commodities from other portions of their plants and other debris entrained therewith during the harvesting process.

SUMMARY OF THE INVENTION

The present invention provides an improved conveyor type separator apparatus for separating peanuts and similar commodities from vinelike structures and other debris entrained with the peanuts during the harvesting process.

In accordance with one aspect of the present invention there is provided an improved separator conveyor characterized by structure which forms a screen having openings sized to permit a peanut to drop through the conveyor screen and into a collecting hopper portion while sticks, stems and other portions of the vine collected with the peanut during the harvesting process are conveyed by the conveyor screen to a separate point of deposit to thereby separate the peanuts from the debris. The improved conveyor screen is characterized by a series of interconnected members which provide generally horizontally extending and spaced apart tines which define an opening of a size to permit a peanut to drop through the conveyor while retaining material such as sticks and stems which are longer than the peanut but may be of no greater cross-sectional thickness or width than the peanut. The conveyor elements also include spaced apart upstanding rake teeth which are operable to distribute the peanuts and entrained debris substantially evenly over the surface of the conveyor to enhance the separation process.

The screen forming conveyor members of the present invention are particularly adapted to provide a superior self cleaning feature of the conveyor screen to rid the conveyor of debris collected or retained on the conveyor during traversal along a substantially horizontal course or run. The provision of separate members forming tines and teeth and which are interconnected at their respective opposite ends by endless conveyor chains provides for separation of the members as they pass over sprockets at the ends of the conveyor run to more effectively rid the conveyor of odd shaped sticks, stems and other items of debris retained on the conveyor during the separating process.

In accordance with another aspect of the present invention there is provided an improved arrangement of an endless conveyor type separator for peanuts and similar commodities wherein the distribution of the material deposited on the conveyor is improved by a combination of a generally horizontal apron or platelike structure formed by a series of elongated slats extending between rake teeth of the separator conveyor wherein the debris laden peanuts are deposited on the slats and raked off of the slats and over a horizontal run of the conveyor screen to more evenly distribute the material along the separating run of the conveyor.

In accordance with yet a further aspect of the present invention there is provided a two-stage separator apparatus utilizing a separator conveyor structure in accordance with the present invention which is adapted to provide a compact and more efficient separator for peanuts and similar seed crops or commodities. The arrangement of side-by-side or dual conveyor runs utilizng the same conveyor structure together with separate collecting hoppers and associated conveyor means disposed beneath the horizontal run of the conveyor screen provides a compact separator apparatus which provides for more thorough cleaning and separation of unwanted debris from peanuts and the like.

The present invention still further provides an improved separating system for peanuts and like commodities utilizing at least two units of a separator apparatus having an improved conveyor type separator screen to provide a two, three or four stage separation process.

Those skilled in the art will recognize the abovedescribed features and advantages of the present invention as well as other superior aspects of the invention upon reading the detailed description which follows in conjunction with the drawings.

DESCRIPTION OF THE PREFERRED EMBODIMENTS

Figure 1:
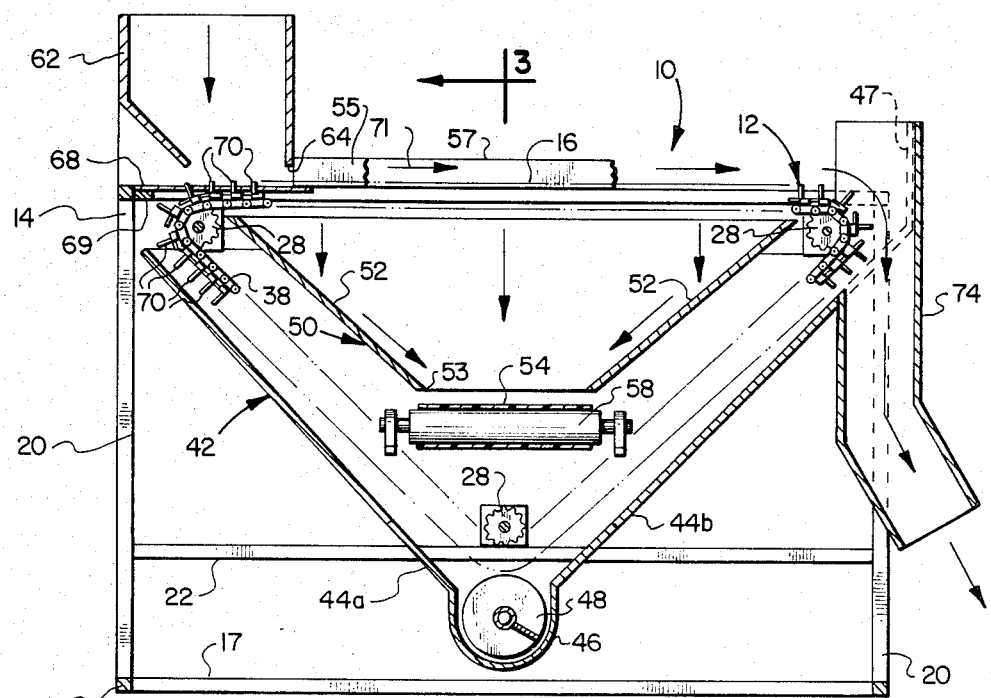
FIG. 1 is a longitudinal side section view of an improved separator apparatus in accordance with the present invention taken generally along the line 1—1 of FIG. 2.

In the description which follows like parts are marked throughout the specification and drawings with the same reference numerals, respectively. The drawings are not necessarily to scale and certain features of the invention may be exaggerated in scale or shown in somewhat schematic form in the interest of clarity and conciseness.

Figure 2:
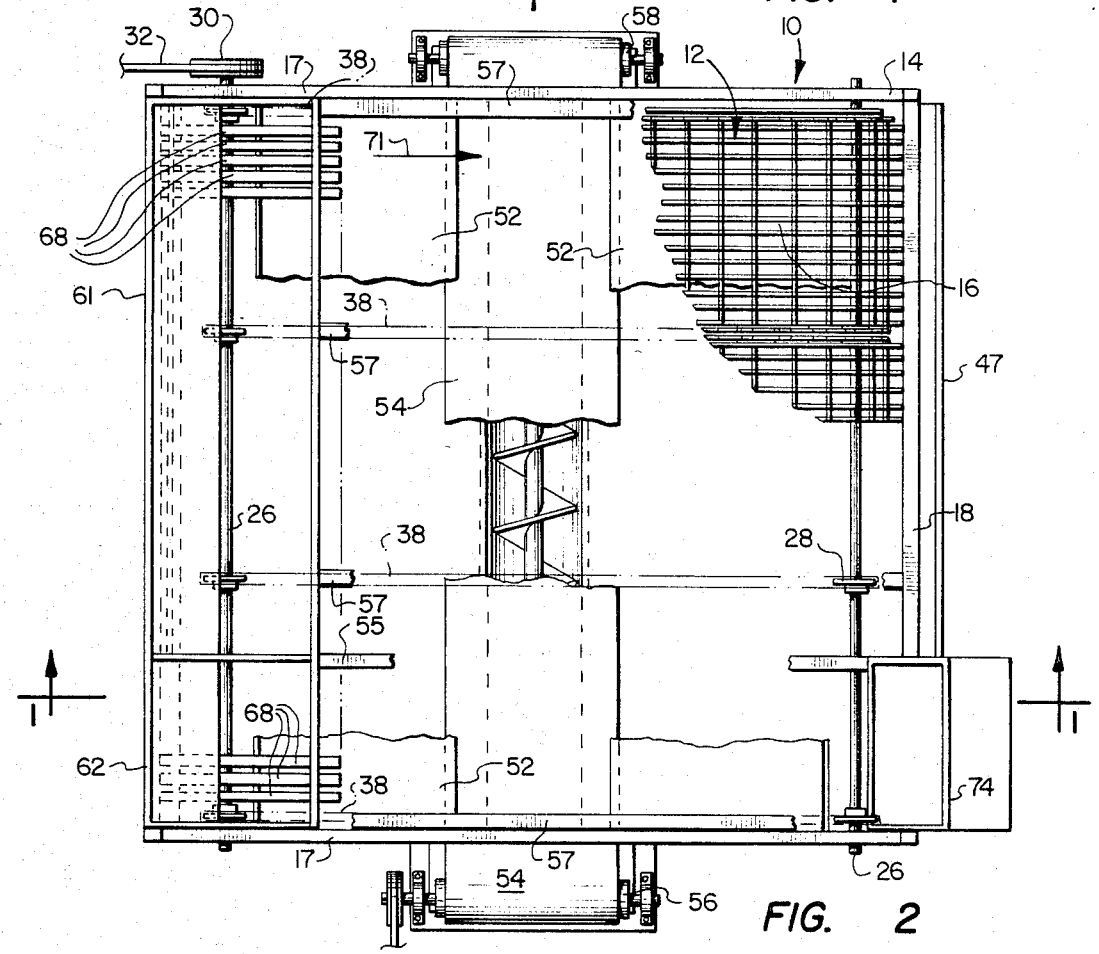
FIG. 2 is a plan view of the apparaus of FIG. 1 with certain structural portions broken away.
Figure 3:
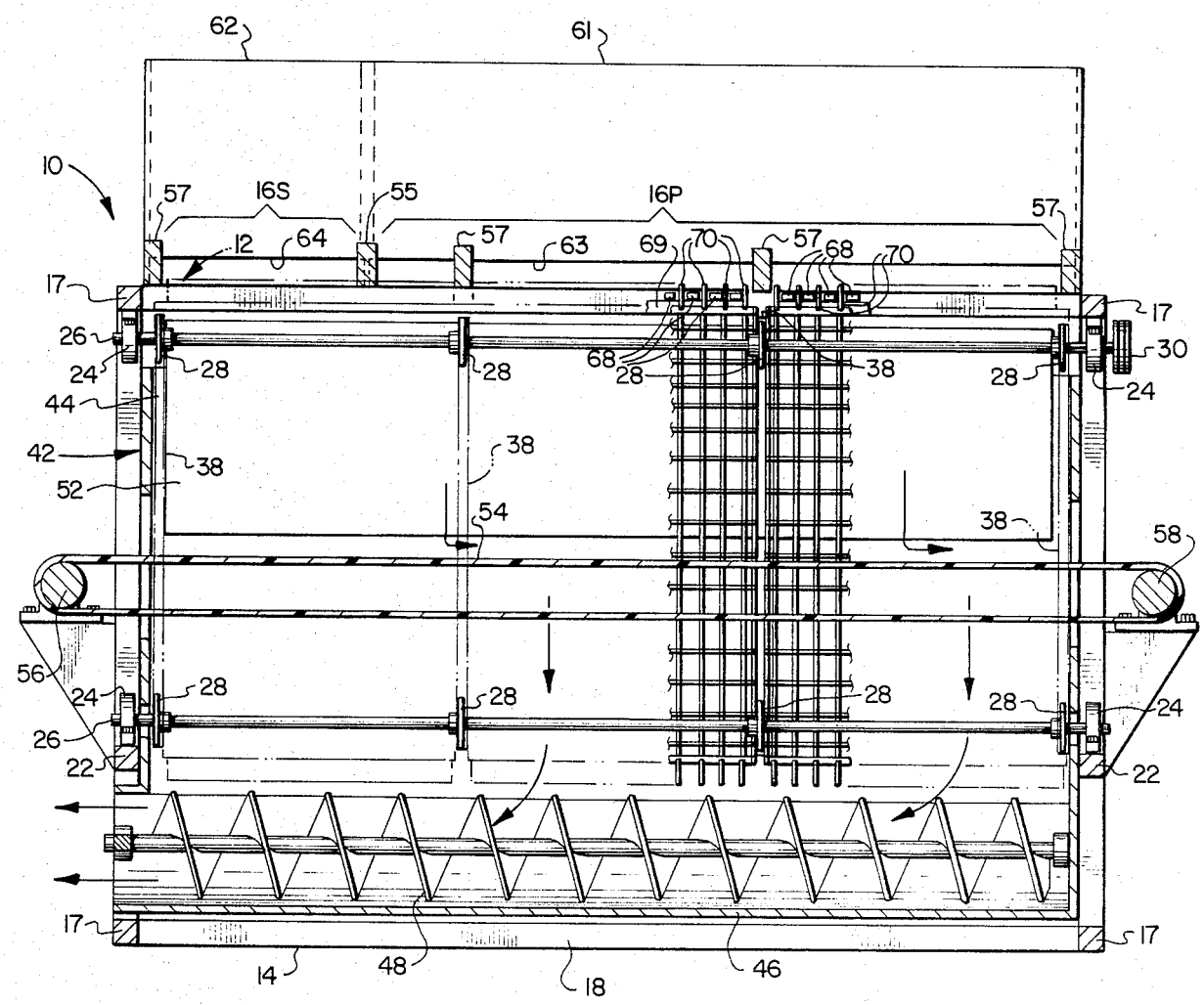
FIG. 3 is a section view taken generally along the line 3—3 of FIG. 1.

Referring to FIGS. 1, 2 and 3, in particular, an improved separator apparatus for peanuts, other seed crops and like commodities is illustrated and generally designated by the numeral 10. The apparatus 10 is characterized by an endless conveyor, generally designated by the numeral 12, which is mounted on a frame 14 to provide a generally horizontal run 16. The frame 14 is preferably a perimeter type structure characterized primarily by spaced apart longitudinal members 17 interconnected by transverse members 18 and vertical corner column members 20. Intermediate longitudinal frame members 22 also extend between the vertical members 20. The upper set of longitudinal members 17 as well as the intermediate members 22 are adapted to support spaced apart pillow block type bearing assemblies 24, FIG. 3, respective pairs of which are in supportive relationship to elongated shafts 26. Each of the shafts 26 is adapted to be in driving or driven engagement with spaced apart roller chain type sprockets 28. In the embodiment of the invention illustrated each of the shafts 26 supports four sprockets 28 spaced apart and suitably mounted on the shafts and keyed thereto for rotation therewith. One of the shafts 26 is in driven engagement with motor, not shown, which is connected to the one shaft by transmission means comprising a pulley 30 and an endless drive belt 32, as shown in FIG. 2 and FIG. 3. The sprockets 28 on each of the shafts 26 are aligned with corresponding sprockets on the other two shafts such that four separate roller chain assemblies 38 are trained around a sprocket on each of the three shafts, as indicated in FIGS. 2 and 3, to form a generally triangular endless chain arrangement. The roller chains 38 are of conventional construction and are each provided with platelike attachment members 40 secured to or formed integral with each chain link or segment 41, 43, see FIG. 4. The members 40 are adapted to support improved conveyor screen structure to be described in further detail herein.

Referring further to FIG. 1 and FIG. 3, the separator apparatus 10 includes a generally V shaped hopper 42 which has opposed downwardly sloping sidewalls 44a and 44b disposed below and extending between the opposite ends of the conveyor 12. The sidewalls of the hopper 42 terminate in a trough portion 46 in which a conveyor screw 48 is rotatably mounted for transporting material deposited in the hopper 42 to a further conveyor structure for recycling said material to the secondary portion of the conveyor 12 which will also be described in further detail herein. The sidewall 44b terminates in a vertical end wall portion 47 adapted to deflect material coming off the end of the conveyor run 16 into the hopper 42.

The apparatus 10 also includes a secondary hopper 50 extending below the conveyor run 16 and between the downward and upward angled runs of the conveyor, as illustrated in FIG. 3. The hopper 50 includes opposed downwardly sloping sidewalls 52 which extend to a opening 53 disposed above an endless conveyor belt 54. The belt 54 extends transversely with respect to the conveyor run 16 and is positioned substantially directly above the conveyor screw 48. The conveyor belt 54 is suitably mounted on spaced apart rotatable drums 56 and 58 and is adapted to be driven by a motor, not shown, for conveying peanuts and like commodities which have been separated by the apparatus 10 away from the apparatus to suitable storage means, not shown.

As shown in FIG. 2, the horizontal upper run 16 of the conveyor 12 is divided by a longitudinal upstanding wall member 55 into primary and secondary conveyor runs 16P and 16S, respectively. The apparatus 10 also includes divider wall members 57 extending above the respective chain assemblies 38 across the horizontal run of the conveyor 12. Depending on the width of conveyor required for the secondary run 16S the wall member 55 could be eliminated and the secondary run defined by the two adjacent members 57 on the left side of the apparatus, viewing FIG. 3. Peanuts, together with sticks and stems from the vines on which they have grown, and other debris picked up by harvesting apparatus are deposited on the conveyor run 16P so that peanuts unattached to any vine structure may be separated from the associated debris by dropping through suitable openings in the conveyor run 16P, as will be described further herein, into the hopper 50 and onto the conveyor belt 54 for transport to a clean peanut storage area, not shown. Peanuts which remain connected to portions of the vine or are otherwise lodged with some of the sticks and stems remaining on the conveyor 12 are deposited in the hopper 42 as they traverse to the end of the horizontal conveyor run and fall into the hopper along the sloping sidewall 44b. The material deposited in the hopper 42 drops into the trough 46 and is transported by the screw 48 to a suitable feeder mechanism and re-deposited on the conveyor 12 along the run 16S which is separated from the portion of the conveyor run 16P by the wall 55. The outboard sidewalls or dividers 57 also prevent lateral displacement of the material on the conveyor runs 16P and 16S. Normally, the peanuts deposited on the conveyor run 16S have been further processed after the primary separation such as being run through de-stemming saws for removing additional portions of the vine or stems connected to the peanut shell. Accordingly, as the peanuts and remaining stems or other debris are deposited on the conveyor run 16S, the completely cleaned peanuts are separated from the sticks and stems and drop into the hopper 50 for transport by the conveyor belt 54 away from the apparatus 10.

The apparatus 10 also includes means for dispensing peanuts or like commodities onto the conveyor runs 16P and 16S. The dispensing means is generally designated by the numerals 61 and 62 in FIGS. 1, 2 ad 3, and may be characterized by suitable hoppers, as shown, associated with each dispensing means and a dispensing rotor, not shown, disposed within a housing and adapted to discharge material into the respective hoppers. The dispensing means described herein may be similar to that which is described in my aforementioned U.S. Pat. No. 3,241,670.

The dispensing hoppers 61 and 62 are provided with respective openings 63 and 64, FIG. 3, through which material is dispensed onto improved structure forming a part of the apparatus 10 and adapted to improve the rate of feeding or dispensing material to the respective conveyor runs 16P and 16S. The dispensing structure is characterized as apron means comprising a plurality of longitudinally extending parallel slat members 68 which project from a support member 69 in the direction of the arrow 71 in FIGS. 1, 2 and 4, which arrow represents the direction of movement of the conveyor run 16. The slats 68 extend from the member 69 in cantilever beam fashion and in parallel relation to each other and are spaced apart suitably to permit movement therebetween of a plurality of spaced apart upstanding rake teeth 70 formed on the conveyor 12. Longitudinal slots formed between each of the apron slats 68 provide clearance for the rake teeth 70 of the conveyor 12 which project up through the slots as the conveyor moves in the direction of the arrow 71. Accordingly, material deposited onto the slats 68 is raked by the teeth 70 and moved out off of the end of the slats onto the conveyor runs 16P and 16S which otherwise have no supporting means above or below said runs except the hopper 50. By introducing material from the dispensing means 61 or 62 in timed fashion by the aforementioned dispensing rotors or other suitable means, and by providing the apron slats 68 and the conveyor rake teeth 70, material is evenly and thoroughly distributed over the conveyor runs to enhance the separating function of the apparatus 10. Material which is no greater in length or width than the width of a slat 68 may be momentarily retained on a slat until material of greater length is deposited on or adjacent to the previously deposited material which then results in all of the material being caught up by the horizontally translating rake teeth 70. The slats 68 are preferably formed of wood or thin metal plate and may actually rest lightly on the surface of the conveyor 12 under the weight of material deposited thereon.

Figure 4:
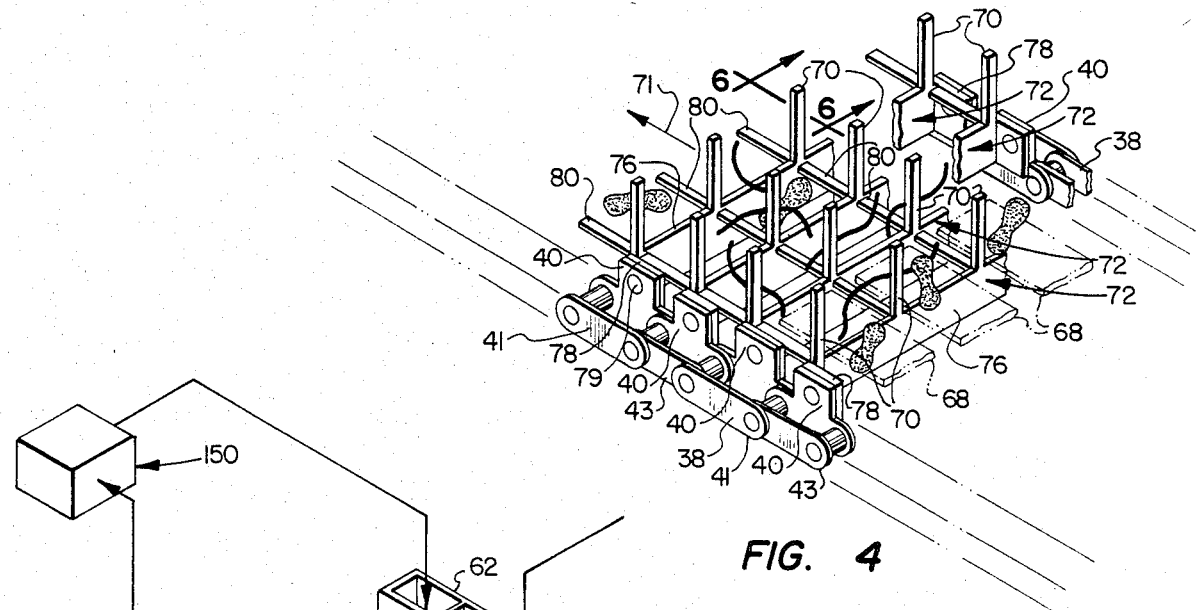
FIG. 4 is a detail perspective view of the separator conveyor structure of the apparatus of the present invention.
Figure 6:
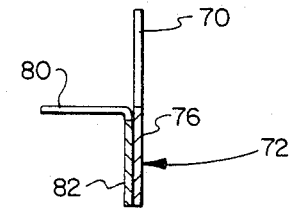
FIG. 6 is a detail section view taken along line 6—6 of FIG. 4.

Referring now particularly to FIG. 4, a portion of the conveyor 12 is illustrated as being made up of a plurality of spaced apart members, each generally designated by the numeral 72, which are adapted to form a screen having a mesh size formed to permit peanuts or similar commodities to drop through the conveyor runs 16P or 16S into the hopper 50 while retaining objects having a length greater than the peanut. The objects retained on the conveyor 12 are then deposited in the hopper 42, or in the case of the conveyor run 16S into a discard material receiving chute 74, shown in FIGS. 1 and 2. The members 72 are characterized by elongated plate portions 76 which are bent at their opposite ends to form mounting pads 78 adapted to be suitably secured to the chain attachment plates 40 by fasteners 79, as shown. The members 72 are preferably formed to have the rake teeth 70 projecting vertically upwardly when the conveyor 12 is oriented along the run 16, as shown in FIGS. 1 and 4. The members 72 are also characterized by spaced apart tines 80 which project perpendicular to the rake teeth 70 and extend from one member 72 to a point directly adjacent to the adjacent member 72 when the conveyor is translating linearly between sprockets 28. The tines 80 are aligned with the rake teeth 70 in the direction of traversal of the conveyor 12 and are preferably formed on separate plate members 82, FIG. 6, which are suitably secured to the plates 76 such as by spot welding the plates 82 and 76 to each other at suitably spaced apart intervals. In the arrangement illustrated in the drawing figures three separate sets of members 72 are suitably secured to the spaced apart chains 38 to form a flexible screen when the conveyor 12 traverses between adjacent shafts 26. For example, over the horizontal run 16 of the conveyor 12 the members 72 form a screen having a mesh size determined by the spacing of the plates 76 and the generally horizontally projecting tines 80. The distance between the plates 76 and corresponding substantially to the length of the tines 80 is preferably on the order of 1.25 inches and the distance between adjacent ones of the tines 80 and the rake teeth 70 is about 1.50 inches for a commodity such as peanuts. Those skilled in the art will appreciate that the spacings of the plates and the tines may vary depending on the size of the opening desired. Moreover, the length of the member 72 may be varied in accordance with the desired width of the conveyor and the maximum length of the member 72 is limited to that which can be adequately supported between the spaced apart conveyor chains without incurring unwanted deflection or mechanical vibrations of the members during operation. The plates 76 and 82 may be fabricated of steel plate of approximately 0.0625 inches thickness and the length of each member 72 may be on the order of 18 to 24 inches.

The structure of the conveyor 12 as described herein and illustrated in the drawings offers several advantages in a separator for peanuts and similar seed crops or commodities. First, the combination of the openings provided by the adjacent members 72 and adjacent tines 80 are of sufficient length to allow a peanut or like article to drop through the conveyor run while retaining sticks, stems and other articles of a length greater than the maximum linear dimension of the opening since the stem or stick will bridge the distance between adjacent tines, adjacent plates or a combination of one and the other. Additionally, the upstanding rake teeth 70, in conjunction with the apron slats 68 improve the distribution of material on the conveyor 12 and alleviate any tendency for the material to bunch up or be deposited on the conveyor run 16 in a clumped configuration. Furthermore, the members 72, being separate elements, have a self cleaning tendency as the conveyor run 16 passes over one of the sets of sprockets 28 such as the set delimiting the downstream end of the conveyor run 16 in the direction of movement of the conveyor. As the members 72 pass around and through a circular arc as defined by the sprocket and shaft arrangement the distal ends of the tines 80 become spaced apart from the adjacent member 72 so that any material lodged between adjacent members tends to be released to fall off of the conveyor and into the hopper 42. Since this process is repeated at least twice more before the conveyor 12 resumes the run 16 this self cleaning function is substantially complete and permits the shedding of debris from the conveyor as well as discharging or dropping any peanuts which might have become lodged in the openings formed by the screenlike structure described. In this way the conveyor performs a more efficient and effective separating process on a continuous basis.

The basic operation of the apparatus 10 is believed to be readily understandable from the foregoing description; however, briefly, the separator may be operated continuously at a desired speed of the conveyor 12 as determiined by the aforementioned motor and associated trasmission arrangement. Peanuts, together with entrained vine material and other debris, may be continuously dispensed at a measured rate from the dispensers 61 and 62 onto the apron formed by the slats 68. As the upper horizontal run 16 is continuously formed by traversal of the members 72 therealong, the rake teeth 70 move up through the slotlike openings formed between the adjacent slats 68 as the members 72 travel over the sprockets 28. As the teeth 70 emerge between the slats 68 the material deposited on the slats is raked out relatively evenly over the conveyor run 16 and as the material moves across the conveyor run above the hopper 50 peanuts which are unattached to any vine material or other debris will fall through the openings formed by the plates 76 and the tines 80 into the hopper to be conveyed away by the belt 54.

Material being continuously deposited on the primary run 16P and not having fallen through the openings in the conveyor 12 are shed from the conveyor as it reaches the sprocket 28 at the downstream end of run 16 and are deposited into the hopper 42. The screw conveyor 48 or a similar suitable conveyor disposed at the bottom of the hopper 42 is operable to convey the material, having undergone a separation process, to a suitable stemming apparatus wherein peanuts still attached to stems and the like may be subjected to a stem cutting operation. Such material will then be conveyed to the dispenser 62 for dispensing onto the portion of the apron associated with the conveyor run 16S. As de-stemmed peanuts, short stems and vine portions are distributed out onto the conveyor run 16S, peanuts will drop through the openings between the tines 80 and the adjacent plates 76 while stems and debris of a length greater than the peanuts will be conveyed to the end of the conveyor run 16S and ejected from the conveyor into the chute 74 for subsequent disposal. Peanuts falling through the conveyor run 16S will be deposited in the hopper 50 and any peanuts not dislodging from the portion of the conveyor 12 forming the run 16S and not ejected into the chute 74 will have an opportunity to fall into the hopper 42 as the conveyor passes over the successive sets of sprockets 28 and further cleans itself. The separator apparatus 10 may, of course, be operated continuously in association with the dispensers 61 and 62 and the conveyors 48 and 54. The particular arrangement for incorporating primary and secondary stages in the apparatus 10 may be modified to utilize the conveyor 12 as only one stage of separator across the entire width thereof. However, the particular arrangement described and shown in the drawings is believed to be unique and to provide particular advantages in the art of separator apparatus for peanuts and other articles which can be separated in like manner.

Figure 5:
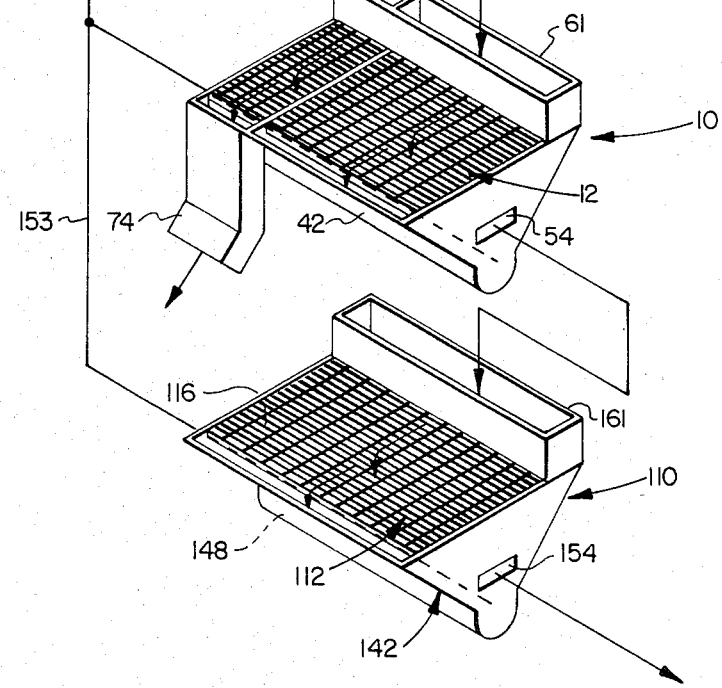
FIG. 5 is a schematic perspective view of a separator system in accordance with the present invention.

Referring now to FIG. 5 there is illustrated a schematic diagram of the separator apparatus 10 in a peanut separator system including a second separator apparatus 110 having an endless screenlike conveyor 112 constructed substantially similar to the conveyor 12. The conveyor 112 is not adapted to have primary and secondary conveyor runs as provided in the apparatus 10.

The separator apparatus 110 includes a dispenser 161 for dispensing peanuts onto the conveyor 112 and is provided with separate hopper portions for delivering cleaned peanuts to a conveyor 154 and for delivering peanuts and other debris remaining on the conveyor run 116 into a hopper 42 for delivery by a conveyor 148 to a peanut de-stemming apparatus, generally designated by the numeral 150 in FIG. 5.

The arrangement of the separator apparatus 10 and the apparatus 110 in the system of FIG. 5 is such that peanuts to be separated are first introduced into the dispenser 61 of the apparatus 10 and conveyed out onto the conveyor run 16P whereby peanuts and other material which fall through the conveyor 12 are collected on the conveyor 54 and fed to the apparatus 110 through its dispenser 161. Peanuts separated on the conveyor run 116 of the conveyor 112 are collected on conveyor 154 and are conducted away by that conveyor to a further processing or bagging operation. Peanuts arriving on the conveyor 154 have been substantially cleaned and are virtually free of any debris. Peanuts and other material which are collected in the hoppers 42 and 142 of the respective apparatus 10 and 110 are conveyed by screw conveyors disposed in the respective hoppers and by suitable elevator means 153 to the de-stemming apparatus 150. After the de-stemming operation the material processed through the apparatus 150 is conducted to the dispenser 62 for disposal on the conveyor run 16S whereby cleaned peanuts from that conveyor run are deposited on the conveyor 54 and run through the separator apparatus 110. Debris retained on the conveyor run 16S is collected in the discharge chute 74 for suitable disposal. Accordingly, with the system illustrated in FIG. 5 all peanuts are subjected to at least a two stage separating process and those peanuts not separated in the primary separation stage of the apparatus 10 or in the apparatus 110 are recycled through the apparatus 10 and 110 by way of the de-stemming apparatus 150. Moreover, any peanuts which fail to be separated by dropping through the conveyors 12 and 112 in succession will be subjected to a three or four stage separation process depending on whether or not they failed to separate on the conveyor run 16P or the conveyor run 116.

Although preferred embodiments of the present invention have been described herein in detail those skilled in the art will recognize that various substitutions and modifications may be made to the specific arrangement and structural features shown without departing from the scope and spirit of the invention as recited in the appended claims.

What I claim is:

1. Separator apparatus for separating articles such as peanuts and like commodities from material such as vine stems and other debris commingled therewith, said apparatus comprising:

a frame;

means forming an endless flexible conveyor disposed on said frame for traversal with respect to said frame and including a substantially horizontal run, said conveyor includng means forming a screen defining a plurality of openings sized to permit said articles to fall through said horizontal run while said screen retains said stems and other debris of a length greater than said openings;

first hopper means disposed beneath said horizontal run for receiving articles separated from said material;

dispensing means for dispensing material including said articles to be separated onto said horizontal run;

said horizontal run is divided into a primary separator portion and a secondary separator portion, each of said portions of said horizontal run including dispensing means, said first hopper means being disposed beneath both of said separator portions of said horizontal run, said apparatus including separate means for receiving material retained on said conveyor screen at the end of said primary and secondary portions of said horizontal run, respectively.

2. The apparatus set forth in claim 1 wherein:

said means for receiving material from said primary portion of said horizontal run comprises a second hopper disposed beneath said conveyor and said first hopper for collecting material retained on said conveyor at the end of said primary portion of said horizontal run.

3. The apparatus set forth in claim 2 including:

conveyor means in communication with said first hopper for conducting clean articles out of said first hopper, and conveyor means in communication with said second hopper for conveying material received in said second hopper to be dispensed onto said secondary separator portion of said conveyor.

4. In a system for separating peanuts and like articles from material commingled with said articles, a first separator apparatus including:

means forming an endless flexible conveyor including a substantially horizontal run divided into a primary and secondary separator portion, respectively, said conveyor including means forming a screen defining a plurality of openings sized to permit said articles to fall through said horizontal run while said screen retains said material of a length greater than said openings;

first hopper means disposed beneath said horizontal run for receiving articles separated from said material in both said primary and secondary separator portions;

respective means for dispensing material including said articles to be separated onto said primary and secondary separator portions of said horizontal run at substantially one end thereof, second hopper means for receiving material from said primary separator portion;

means for receiving material from said secondary separator portion for discharging material from said system;

means for conveying material from said first hopper means to a second separator apparatus, said second separator apparatus including means forming an endless flexible conveyor including a substantially horizontal run, said conveyor of said second apparatus including means forming a screen defining a plurality of openings sized to permit said articles to fall through said horizontal run of said conveyor of said second apparatus while said screen retains material of a length greater than said openings;

third hopper means for receiving articles separated on said horizontal run of said conveyor of said second apparatus;

fourth hopper means for receiving material from said conveyor of said second apparatus; and means for returning material from said second and fourth hopper means, respectively, to said dispensing means for said secondary separator portion of said first separator apparatus.

5. The system set forth in claim 4 wherein:

said system includes de-stemming means interposed in said means for returning said material to said first separator apparatus.

6. Separator apparatus for separating articles such as peanuts and like commodities from material such as vine stems and other debris commingled therewith, said apparatus comprising:

a frame;

means forming a endless flexible conveyor disposed on said frame for traversal with respect to said frame and including a substantially horizontal run, said horizontal run being divided into a primary separator portion and a secondary separator portion, said conveyor including means forming a screen defining a plurality of openings sized to permit said articles to fall through said horizontal run while said screen retains said stems and other debris of a length greater than said openings;

first hopper means disposed beneath both of said separator portions of said horizontal run for receiving articles separated from said material;

dispensing means for dispensing material including said articles to be separated onto each of said separator portions of said horizontal run at substantially one end thereof, said dispensing means including means forming an apron extending over a portion of said one end of said horizontal run for receiving material to be separated;

said means forming said screen includes means for raking material off of said apron and onto said horizontal run of said conveyor to distribute said material over the surface of said horizontal run; and separate means for receiving material retained on said conveyor screen at the end of said primary and secondary separator portions, respectively.

7. The apparatus set forth in claim 6 wherein:

said means for receiving material from said primary portion of said horizontal run comprises a second hopper disposed beneath said conveyor and said first hopper for collecting material retained on said conveyor at the end of said primary portion of said horizontal run.

8. The apparatus set forth in claim 7 including:

conveyor means in communication with said first hopper for conducting clean articles out of said first hopper.

9. The apparatus set forth in claim 7 including:

conveyor means in communication with said second hopper for conducting material from said second hopper.

10. Separator apparatus for separating articles such as peanuts and like commodities from material such as vine stems and other debris commingled therewith, said apparatus comprising:

a frame;

means forming an endless flexible conveyor disposed on said frame for traversal with respect to said frame and including a substantially horizontal run, said horizontal run being divided into a primary separator portion and a secondary separator portion, said conveyor including means forming a screen defining a plurality of openings sized to permit said articles to fall through said horizontal run while said screen retains said material including stems and other debris of a length greater than said openings;

first hopper means disposed beneath said horizontal run for receiving articles separated from said material;

dispensing means for dispensing material including said articles to be separated onto each of said separator portions of said horizontal run; and separate means for receiving material retained on said screen at the end of said primary and secondary separator portions, respectively.

11. The apparatus set forth in claim 10 including:

means forming an apron extending over a portion of said one end of said horizontal run for receiving material to be separated;

said means forming said screen includes means for raking material off of said apron and onto said horizontal run of said conveyor to distribute said material over the surface of said horizontal run; and said raking means includes a plurality of spaced apart upstanding teeth formed on said conveyor and operable to extend through a plurality of spaced apart parallel slots formed in said apron and to traverse said slots for raking material from said apron onto said conveyor.

12. The apparatus set forth in claim 11 wherein:

said apron is formed by a plurality of elongated members supported on said frame and extending parallel to each other and spaced apart to form said slots, said members each comprising a generally horizontally extending cantilever beam disposed on said frame adjacent one end of said conveyor.

13. The apparatus set forth in claim 11 wherein:

said conveyor screen is formed by a plurality of members spaced apart in the direction of traversal of said horizontal run and extending laterally of the direction of traversal of said horizontal run, and said members including a plurality of spaced apart tines extending from respective ones of said members toward adjacent ones of said members, respectively, adjacent ones of said members and adjacent ones of said tines defining said openings in said conveyor screen.

14. The apparatus set forth in claim 13 wherein said rake teeth are formed spaced apart on said members, respectively.

15. The apparatus set forth in claim 14 wherein:

said rake teeth on each of said members are aligned with said tines on each of said members in the direction of traversal of said conveyor.

16. The apparatus set forth in claim 13 wherein:

said conveyor includes a pair of spaced apart endless chain means, said chain means being trained over sprocket means rotatably disposed on said frame and delimiting said horizontal run, said members being supported by said chain means.

17. The apparatus set forth in claim 13 wherein:

said tines of each of said members extend to a point directly adjacent to the adjacent member along said horizontal run and said tines of each of said members move relative to the adjacent member as said members traverse an arc around said sprocket means to permit material retained on said conveyor screen to be expelled from said conveyor.

18. The apparatus set forth in claim 17 wherein:

said members comprise a pair of elongated plates, each of said plates having said tines and said teeth formed thereon, respectively, said plates being secured together to form said members.

* * * * *